(12) United States Patent
Long et al.

(10) Patent No.: US 11,734,809 B2
(45) Date of Patent: Aug. 22, 2023

(54) METHOD AND APPARATUS FOR PROCESSING IMAGE

(71) Applicant: BEIJING BAIDU NETCOM SCIENCE AND TECHNOLOGY CO., LTD., Beijing (CN)

(72) Inventors: Xiang Long, Beijing (CN); Ping Wang, Beijing (CN); Zhichao Zhou, Beijing (CN); Fu Li, Beijing (CN); Dongliang He, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 282 days.

(21) Appl. No.: 17/174,002

(22) Filed: Feb. 11, 2021

(65) Prior Publication Data

US 2021/0334950 A1 Oct. 28, 2021

(30) Foreign Application Priority Data

Apr. 23, 2020 (CN) .......................... 202010325574.1

(51) Int. Cl.
*G06T 7/00* (2017.01)
*G06N 3/04* (2023.01)
*G06N 3/08* (2023.01)

(52) U.S. Cl.
CPC .............. *G06T 7/0002* (2013.01); *G06N 3/04* (2013.01); *G06N 3/08* (2013.01);
(Continued)

(58) Field of Classification Search
CPC ......... G06T 7/0002; G06T 2207/10016; G06T 2207/20081; G06T 2207/20084;
(Continued)

(56) References Cited

U.S. PATENT DOCUMENTS

| 8,370,282 B1 * | 2/2013 | Leung ................ G06V 10/7784 706/20 |
| 2011/0052023 A1 * | 3/2011 | Garg .................. G06V 10/7715 382/294 |

(Continued)

FOREIGN PATENT DOCUMENTS

| CN | 106503614 A | 3/2017 |
| CN | 108234870 A | 6/2018 |

(Continued)

OTHER PUBLICATIONS

Wu, Q., et al., "No reference image quality assessment metric via multi-domain structural information and piecewise regression", J. Vis. Commun. Image R. 32 (2015) 205-216.*

(Continued)

*Primary Examiner* — Xuemei G Chen
(74) *Attorney, Agent, or Firm* — Seed IP Law Group LLP

(57) ABSTRACT

Embodiments of the present disclosure provide a method and apparatus for processing an image, and relates to the field of computer vision technology. The method may include: acquiring a value to be processed, where the value to be processed is associated with an image to be processed; and processing the value to be processed by using a quality scoring model to generate a score of the image to be processed in a target scoring domain, where the score of the image to be processed in the target scoring domain is related to an image quality of the image to be processed.

12 Claims, 4 Drawing Sheets

(52) U.S. Cl.
CPC ............... *G06T 2207/10016* (2013.01); *G06T 2207/20081* (2013.01); *G06T 2207/20084* (2013.01); *G06T 2207/30168* (2013.01)

(58) Field of Classification Search
CPC ........ G06T 2207/30168; G06T 7/0004; G06N 3/04; G06N 3/08; G06F 18/00
See application file for complete search history.

(56) References Cited

U.S. PATENT DOCUMENTS

| | | | | |
|---|---|---|---|---|
| 2013/0251272 | A1* | 9/2013 | Sauer | G06V 10/993 382/218 |
| 2014/0003734 | A1* | 1/2014 | Umansky | G06T 5/003 382/275 |
| 2014/0169662 | A1* | 6/2014 | Liu | G06V 30/194 382/218 |
| 2015/0010245 | A1* | 1/2015 | Kim | G06T 5/005 382/254 |
| 2015/0379373 | A1* | 12/2015 | Bhatia | G06T 7/0002 382/197 |
| 2018/0114082 | A1* | 4/2018 | Choi | G06V 10/993 |
| 2020/0089966 | A1* | 3/2020 | Tsai | G06F 18/2155 |
| 2021/0004935 | A1 | 1/2021 | Yao et al. | |

FOREIGN PATENT DOCUMENTS

| | | | |
|---|---|---|---|
| CN | 109840903 | A | 6/2019 |
| CN | 110766658 | A | 2/2020 |
| JP | 2005129070 | A | 5/2005 |
| JP | 2014056442 | A | 3/2014 |
| JP | 2018516412 | A | 6/2018 |

OTHER PUBLICATIONS

Bosse et al., "A deep neural network for image quality assessment," 2016 IEEE International Conference on Image Processing (ICIP), Sep. 25, 2016, pp. 3773-3777.

Extended European Search Report, dated Jul. 29, 2021, for European Patent Application No. 21158677.1. (9 pages).

"Image Quality Calculator—Apps on Google Play," Sep. 8, 2019. (3 pages).

Liu et al., "Quality Aware Network for Set to Set Recognition," Apr. 11, 2017. (10 pages).

"Automatically 'reject' images submitted to a folder that don't meet certain resolution/size criteria," Jul. 1, 2015, (4 pages).

Bosse et al., "Neural Network-Based Full-Reference Image Quality Assessment," IEEE. (5 pages).

Fu et al., "Blind Image Quality Assessment for Multiply Distorted Images VIA Convolutional Neural Networks," IEEE:1075-1079, 2016.

Vivekanand et al., "Automated Image Assessment of Posterior Capsule Opacification Using Holder Exponents," IEEE: 538-541, 2013.

Wang et al., "Blind blur measurement of stereoscopic images based on BEMD," China Academic Journal Electronic Publishing House 40(9), Sep. 2013. (7pages).

* cited by examiner

METHOD AND APPARATUS FOR PROCESSING IMAGE

CROSS-REFERENCE TO RELATED APPLICATIONS

This application claims priority to Chinese Patent Application No. 202010325574.1, filed on Apr. 23, 2020, titled "Method and apparatus for processing image," which is hereby incorporated by reference in its entirety.

TECHNICAL FIELD

Embodiments of the present disclosure relate to the field of computer technology, specifically to the field of computer vision technology, and particularly to a method and apparatus for processing an image.

BACKGROUND

With the development of Internet technology, various Internet platforms have gradually emerged, such as video websites and live broadcast platforms. When watching a recorded video or live broadcast, the quality of an image may directly affect user's watching experience. For example, high image quality can help a user obtain a better watching experience, while poor image quality may cause the user to give up watching.

The user's evaluation on the image is a subjective evaluation, so different users may have different evaluations on the quality of the same image.

SUMMARY

A method and apparatus for processing an image, an electronic device, and a storage medium are provided.

According to a first aspect, an embodiment of the present disclosure provides a method for processing an image. The method includes: acquiring a value to be processed, where the value to be processed is associated with an image to be processed; and processing the value to be processed by using a quality scoring model to generate a score of the image to be processed in a target scoring domain, where the score of the image to be processed in the target scoring domain is related to an image quality of the image to be processed.

According to a second aspect, an embodiment of the present disclosure provides an apparatus for processing an image. The apparatus includes: an acquisition unit, configured to acquire a value to be processed, where the value to be processed is associated with an image to be processed; and a generation unit, configured to process the value to be processed by using a quality scoring model to generate a score of the image to be processed in a target scoring domain, where the score of the image to be processed in the target scoring domain is related to an image quality of the image to be processed.

According to a third aspect, an embodiment of the present disclosure provides an electronic device, including: one or more processors; and a storage apparatus for storing one or more programs, The one or more programs, when executed by the one or more processors, cause the one or more processors to implement any embodiment of the method for processing an image.

According to a fourth aspect, an embodiment of the present disclosure provides a computer-readable storage medium, storing a computer program thereon. The computer program, when executed by a processor, causes the processor to implement any embodiment of the method for processing an image.

BRIEF DESCRIPTION OF THE DRAWINGS

After reading detailed descriptions of non-limiting embodiments with reference to following accompanying drawings, other features, objectives and advantages of the present disclosure will become more apparent.

DETAILED DESCRIPTION OF EMBODIMENTS

Example embodiments of the present disclosure will be described below in combination with accompanying drawings, which include various details of embodiments of the present disclosure to facilitate understanding and should be regarded as examples. Therefore, it should be appreciated by those of ordinary skill in the art that various changes and modifications can be made to the embodiments described here without departing from the scope and spirit of the present disclosure. Likewise, for clarity and conciseness, descriptions of well-known functions and structures are omitted in the following description.

It should be noted that the embodiments in the present disclosure and the features in the embodiments may be combined with each other without conflicts. The present disclosure will be described below in detail with reference to the accompanying drawings and in combination with the embodiments.

Figure 1:
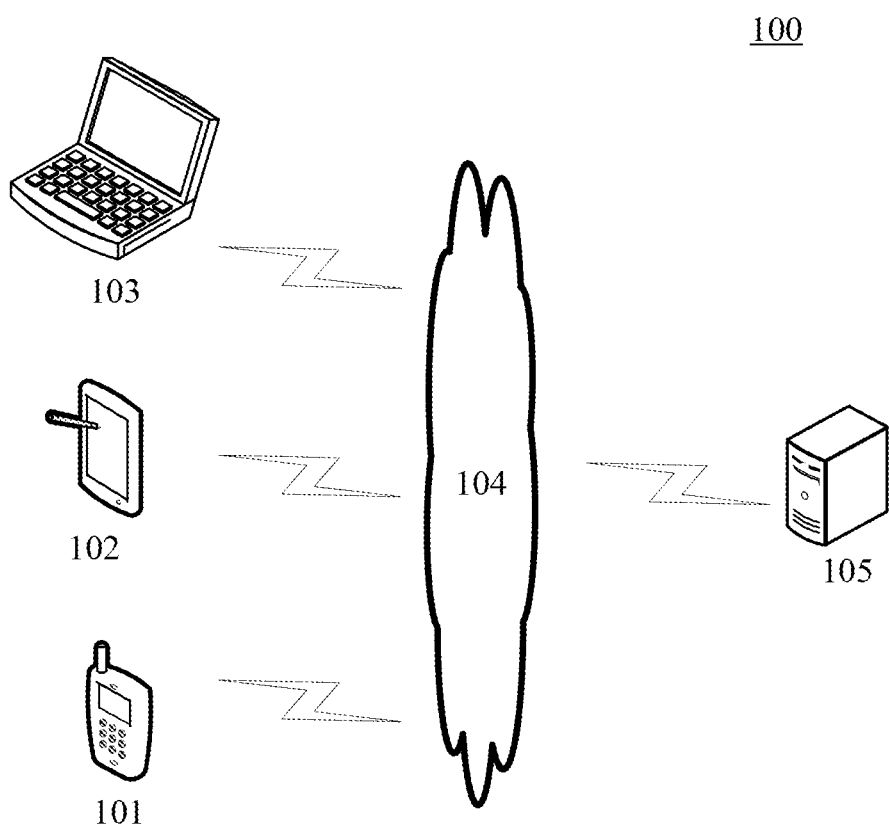
FIG. 1 is an example system architecture diagram to which some embodiments of the present disclosure can be applied.

FIG. 1 shows an example system architecture 100 to which a method for processing an image or an apparatus for processing an image according to some embodiments of the present disclosure may be applied.

As shown in FIG. 1, the system architecture 100 may include terminal devices 101, 102, and 103, a network 104, and a server 105. The network 104 is used to provide a medium for communication links between the terminal devices 101, 102, and 103 and the server 105. The network 104 may include various types of connections, such as wired or wireless communication links, or optical fiber cables.

A user may use the terminal devices 101, 102, and 103 to interact with the server 105 through the network 104 to receive or send messages and the like. The terminal devices 101, 102, and 103 may be installed with various communication client applications, such as video applications, live broadcast applications, instant messaging tools, E-mail clients, and social platform software.

The terminal devices 101, 102, and 103 here may be hardware or software. When the terminal devices 101, 102, and 103 are hardware, they may be various electronic devices with display screens, including but not limited to a smart phone, a tablet computer, an e-book reader, a laptop portable computer, a desktop computer, and the like. When the terminal devices 101, 102, and 103 are software, they may be installed in the above-listed electronic devices. The terminal devices 101, 102, and 103 may be implemented as a plurality of software or software modules (for example, a plurality pieces of software or a plurality of software modules used to provide distributed services), or as single piece of software or single software modules. Specific limitations are not given here.

The server 105 may be a server providing various services, for example, a background server providing supports for the terminal devices 101, 102, and 103. The background server may process, such as analyze, a received value to be processed, and feed back a processing result (for example, a score of an image to be processed in a target scoring domain) to the terminal device.

It should be noted that the method for processing an image according to embodiments of the present disclosure may be executed by the server 105 or the terminal devices 101, 102, or 103, and accordingly, the apparatus for processing an image may be provided in the server 105 or the terminal device 101, terminal device 102, or terminal device 103.

It should be understood that the numbers of the terminal devices, the network, and the server in FIG. 1 are merely illustrative. Any number of terminal devices, networks and servers may be configured according to actual requirements.

Figure 2:
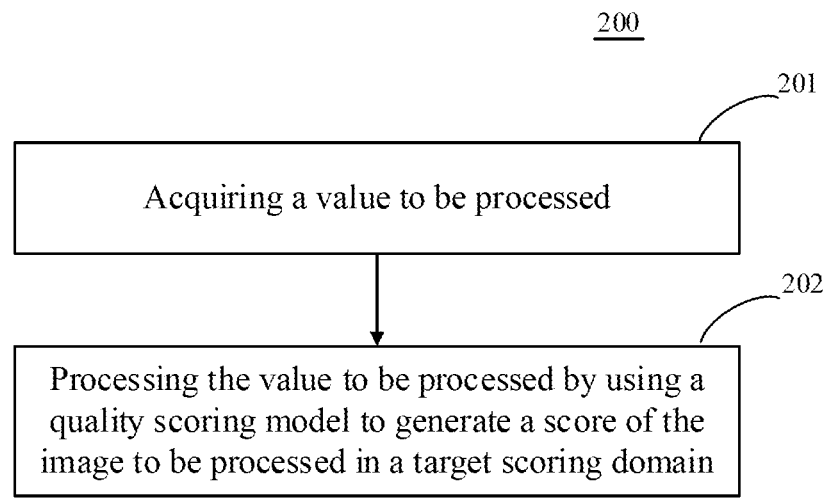
FIG. 2 is a flowchart of a method for processing an image according to an embodiment of the present disclosure.

Continuing to refer to FIG. 2, a flow 200 of a method for processing an image according to an embodiment of the present disclosure is shown. The method for processing an image includes the following steps.

Step 201: acquiring a value to be processed. The value to be processed is associated with an image to be processed.

In this embodiment, the executing body (for example, the server or the terminal device shown in FIG. 1) on which the method for processing an image runs may acquire the value to be processed. Specifically, the value to be processed is associated with the image to be processed. For example, the value to be processed may be generated based on the image to be processed. For example, the value to be processed corresponding to the image to be processed is generated by means of a preset corresponding relationship (such as a preset model or a preset corresponding relationship table) between the image to be processed and the value to be processed. In addition, the value to be processed may also be an attribute value of the image to be processed, such as definition. The image in an embodiment of the present disclosure may be a video frame of a video, or a non-video frame, that is, a single image.

In practice, the executing body may directly acquire the value to be processed from the local or other electronic device, or may first acquire the image to be processed and then generate the value to be processed in real time by using the image to be processed.

Step 202: processing the value to be processed by using a quality scoring model to generate a score of the image to be processed in a target scoring domain. The score of the image to be processed in the target scoring domain is related to an image quality of the image to be processed.

In this embodiment, the executing body may process the value to be processed by using the quality scoring model, so as to obtain the score output from the quality scoring model. In practice, the executing body may input the value to be processed into the quality scoring model to generate the score. In addition, the executing body may also continue to process the value to be processed by using the quality scoring model after acquiring the value to be processed by means of the quality scoring model.

The above-mentioned score is a score of the image to be processed in the target scoring domain, that is, a target domain. The quality scoring model is a model for generating, for an image, a score related to an image quality. In the same scoring domain, the higher the score of an image is, the better the image quality is. Image quality influencing factors may include at least one item, such as definition, and may also include aesthetics, contrast and/or brightness of a target and a background, and the like. The score of the image quality of an image is affected by one or more quality influencing factors of the image. Scores of each scoring domain may have a corresponding value range, and the value ranges of scores of different scoring domains may be the same or different. When the image quality of an image is within a preset quality range, the quality influencing factors of the image have different effects on the score of the image in different scoring domains. The preset quality range here may be a general image quality that is neither a high image quality nor a poor image quality.

For example, there are three images A, B, and C. The definition of the three images sequentially increase, and are respectively a very blurry video, a slightly blurry video, and a clear video. The value range of a first scoring domain is 0-100 scores, and the scores of the three images are respectively 1, 2, and 8 scores. The value range of a second scoring domain is 0-10 scores, and the scores of the three images are respectively 10, 50, and 80 scores. The influence of definition on the scores in the first scoring domain is greater than that in the second scoring domain.

In practice, the quality scoring model may be, for example, various functions and deep neural networks such as convolutional neural networks used to characterize the corresponding relationship between the value to be processed of the image to be processed and the score of the image.

According to the method provided by the embodiments of the present disclosure, a score used to characterize an image quality in a target scoring domain may be acquired from the value to be processed, thereby enriching the acquisition form of the score. In addition, the accuracy of generating the score may be improved by means of a quality scoring model.

In some optional implementations of this embodiment, the value to be processed is a score of the image to be processed in an original scoring domain; and step 202 may include: inputting the score of the image to be processed in the original scoring domain into the quality scoring model to obtain the score of the image to be processed in the target scoring domain, where the quality scoring model is a monotonic neural network, and the number of hidden units in the monotonic neural network is smaller than a preset threshold.

In these optional implementations, the executing body may acquire the score of the image to be processed in the original scoring domain, and input the score into the quality scoring model to obtain the score output from the quality scoring model. The score output here is the score of the image to be processed in the target scoring domain. The original scoring domain and the target scoring domain may be any two different scoring domains, and the quality scoring model is used to generate the score in the target scoring domain from the score in the original scoring domain. The hidden units may be units other than an input unit and an output unit in the monotonic neural network, such as fully connected layers. For example, the number of fully connected layers in the monotonic neural network may be smaller than the number of fully connected layers in a conventional monotonic neural network. For example, in the case of three fully connected layers in the conventional monotonic neural network, the monotonic neural network may only retain one or two fully connected layers.

Specifically, the quality scoring model may be a monotonic neural network, and may also be a monotonic increasing function. The relationship between the output and the input of the monotonic neural network may be a monotonic increasing relationship. For example, the monotonic neural network may be an unconstrained monotonic neural network.

Optionally, the monotonic neural network may be obtained by training through the following steps: acquiring a plurality of training samples, where a training sample among the plurality of training samples includes the score of the image in the original scoring domain, and a reference score of the image in the target scoring domain; then, inputting the score of the image in the original scoring domain in the training sample into an initial monotonic neural network to obtain a predicted score, output from the initial monotonic neural network, of the image in the target scoring domain; and finally, inputting the predicted score and the reference score in the training sample into a preset loss function to obtain a loss value, and performing training by means of the loss value, for example, performing back propagation in the monotonic neural network, to obtain the trained monotonic neural network. The executing body of the training process may be the above-mentioned executing body or other electronic device. The initial monotonic neural network refers to a monotonic neural network to be trained.

The above-mentioned executing body or other electronic device may automatically learn the monotonicity between the score in the original scoring domain and the score in the target scoring domain through the training sample, which also improves the accuracy of the generated score in the target scoring domain.

These implementations may directly generate the score of the image in another scoring domain from the score of the image in one scoring domain by means of the quality scoring model, thereby realizing the conversion of scores between different scoring domains. Moreover, these implementations may learn to obtain a monotonic neural network without obtaining a large number of samples in the target scoring domain, which improves the learning efficiency. In addition, the monotonic neural network uses fewer hidden units, which may improve the efficiency of the monotonic neural network.

Figure 3:
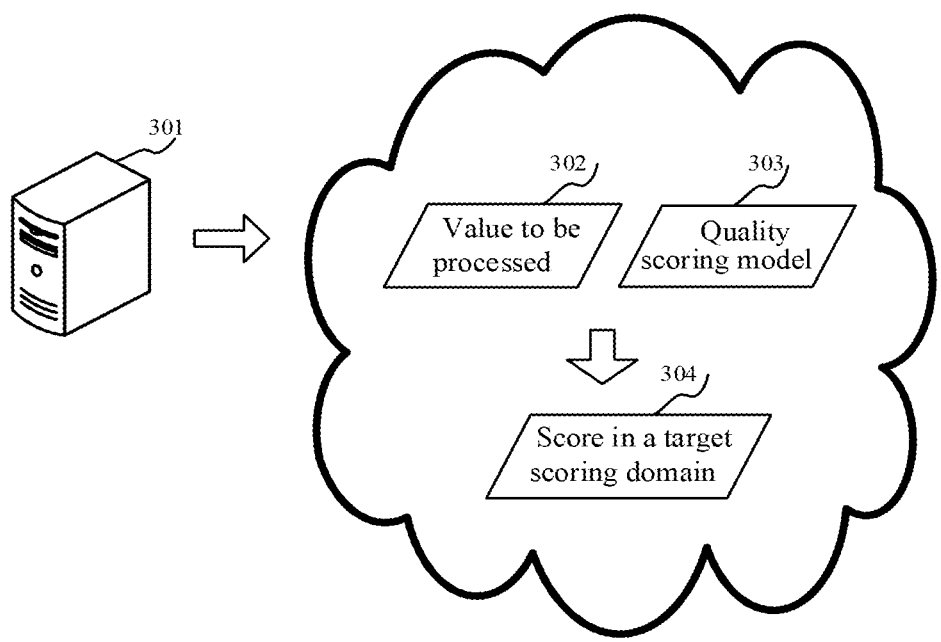
FIG. 3 is a schematic diagram of an application scenario of the method for processing an image according to an embodiment of the present disclosure.

Continue to refer to FIG. 3, which is a schematic diagram of an application scenario of the method for processing an image according to an embodiment. In the application scenario of FIG. 3, an execution body 301 acquires a value to be processed 302. The value to be processed is associated with the image to be processed, for example, the value to be processed is generated based on the image to be processed. The execution body 301 processes the value to be processed 302 by using a quality scoring model 303 to generate a score 304 of the image to be processed in a target scoring domain. The score of the image to be processed in the target scoring domain is related to an image quality of the image to be processed.

Figure 4:
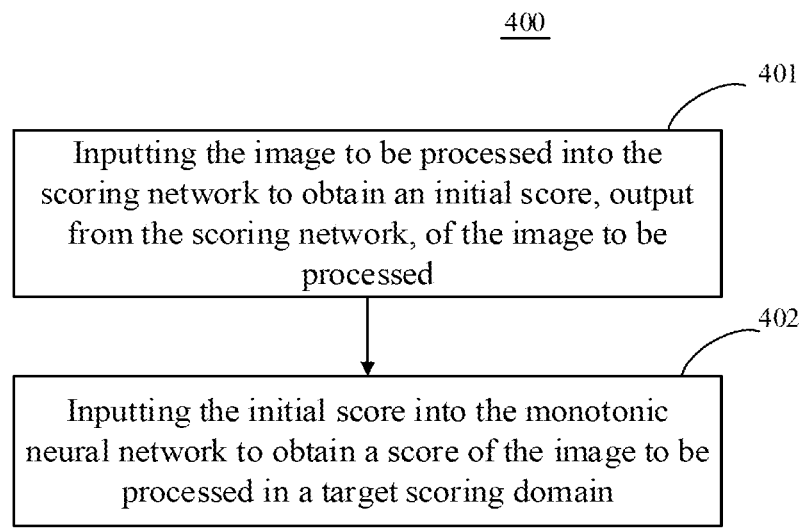
FIG. 4 is a flowchart of a method for processing an image according to another embodiment of the present disclosure.

Further referring to FIG. 4, a flow 400 of an embodiment of the method for processing an image is shown. The quality scoring model may include a scoring network and a monotonic neural network. The flow 400 includes the following steps.

Step 401: inputting the image to be processed into the scoring network to obtain an initial score, output from the scoring network, of the image to be processed.

In this embodiment, the executing body (such as the server or terminal device shown in FIG. 1) on which the method for processing an image runs may input the image to be processed into the scoring network to obtain the initial score of the image to be processed. The initial score is output from the scoring network.

The scoring network here may be any deep neural network that may generate a value associated with the image from the image, such as a convolutional neural network, or a residual neural network. Specifically, the initial score here is not a score in any scoring domain, but only an intermediate value used to generate a score in a certain scoring domain.

Step 402: inputting the initial score into the monotonic neural network to obtain a score of the image to be processed in a target scoring domain. The number of hidden units in the monotonic neural network is smaller than a preset threshold.

In this embodiment, the above-mentioned executing body may input the initial score into the monotonic neural network to obtain the score of the image to be processed in the target scoring domain. The score obtained here is output from the monotonic neural network. The monotonic neural network may obtain, from the initial score of the image to be processed, the score of the image to be processed in the target scoring domain.

A training sample for the quality scoring model includes: an image and a reference score of the image in a domain corresponding to a target domain identifier. Specifically, the training steps may include: inputting the image in the training sample into a scoring network in an initial quality scoring model to obtain an initial score output by the scoring network; inputting the initial score into a monotonic neural network in the initial quality scoring model to obtain a score, output by the monotonic neural network, of the image in the target scoring domain; and then, inputting the score and the reference score into a preset loss function to obtain a loss value, and training the initial quality scoring model by means of the loss value, for example, performing back propagation, to obtain a trained initial quality scoring model.

The training steps may be executed by the above-mentioned executing body or other electronic device. In this way, the executing body or other electronic device may perform joint training by using the scoring network and the monotonic neural network, thereby obtaining the quality scoring model that may accurately determine the score in the target scoring domain.

In this embodiment, the accurate score of the image to be processed in the target scoring domain may be generated by means of both the scoring network and the monotonic neural network.

In some optional implementations of this embodiment, the quality scoring model includes at least two monotonic neural networks, and different monotonic neural networks in the at least two monotonic neural networks correspond to different scoring domains; and step 402 may include: inputting the initial score into the at least two monotonic neural networks to obtain a score, output from each of the at least two monotonic neural networks, of the image to be processed in a scoring domain corresponding to the monotonic neural network.

In these optional implementations, the number of monotonic neural networks included in the quality scoring model is at least two. The executing body inputs the initial score into the at least two monotonic neural networks to obtain a score output from each of the at least two monotonic neural networks. The number of target scoring domains is at least two, and each output score corresponds to a target scoring domain.

These implementations may efficiently generate scores of the image in a plurality of scoring domains by means of the quality scoring model that combines a plurality of monotonic neural networks.

In some optional implementations of this embodiment, the method may further include: acquiring a training sample set, where a training sample in the training sample set includes a sample image and a reference score of the sample image in a specified scoring domain, and the specified scoring domain and the target scoring domain are different scoring domains; inputting the sample image into the scoring network to obtain an initial score of the sample image; inputting the initial score of the sample image into a monotonic neural network to be trained to obtain a predicted score of the sample image in the specified scoring domain; and determining a loss value of the predicted score based on the reference score and the predicted score, and training the monotonic neural network to be trained by means of the loss value to obtain a trained monotonic neural network.

In these optional implementations, the executing body may separately train the monotonic neural network to be trained, that is, train the monotonic neural network by using the initial score output by the scoring network. The reference score may be considered as a true value of the sample image in the specified scoring domain. Specifically, the executing body may input the reference score and the predicted score into a preset loss function to obtain the loss value, and perform training by using the loss value, for example, perform back propagation in the monotonic neural network, to obtain the trained monotonic neural network.

By means of training in these implementation, the executing body or other electronic equipment may efficiently train the monotonic neural network that may generate a score in any specified scoring domain.

Figure 5:
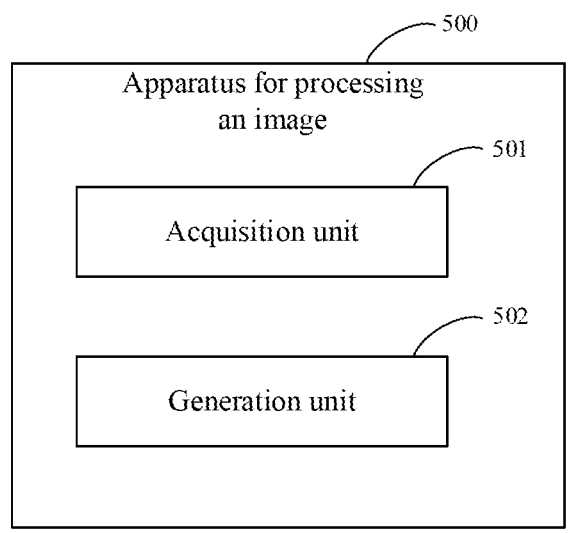
FIG. 5 is a schematic structural diagram of an apparatus for processing an image according to an embodiment of the present disclosure.

Further referring to FIG. 5, as an implementation of the methods shown in the above figures, an embodiment of the present disclosure provides an apparatus for processing an image. The apparatus embodiment corresponds to the method embodiment shown in FIG. 2, in addition to the features described below, the apparatus embodiment may also include the same or corresponding features or effects as the method embodiment shown in FIG. 2. The apparatus may be applied to various electronic devices.

As shown in FIG. 5, the apparatus 500 for processing an image in this embodiment includes: an acquisition unit 501 and a generation unit 502. The acquisition unit 501 is configured to acquire a value to be processed. The value to be processed is associated with an image to be processed. The generation unit 502 is configured to process the value to be processed by using a quality scoring model to generate a score of the image to be processed in a target scoring domain. The score of the image to be processed in the target scoring domain is related to an image quality of the image to be processed.

In this embodiment, the specific processing of the acquisition unit 501 and the generation unit 502 of the apparatus 500 for processing an image and the technical effects brought accordingly may be referred to the relevant descriptions of step 201 and step 202 in the embodiment corresponding to FIG. 2, and details are not described herein again.

In some optional implementations of this embodiment, the value to be processed is a score of the image to be processed in an original scoring domain; and the generation unit is further configured to process the value to be processed by using the quality scoring model to generate the score of the image to be processed in the target scoring domain by: inputting the score of the image to be processed in the original scoring domain into the quality scoring model to obtain the score of the image to be processed in the target scoring domain, where the quality scoring model is a monotonic neural network, and the number of hidden units in the monotonic neural network is smaller than a preset threshold.

In some optional implementation modes of this embodiment, the quality scoring model includes a scoring network and a monotonic neural network. The acquisition unit is further configured to acquire the value to be processed by: inputting the image to be processed into the scoring network to obtain an initial score, output by the scoring network, of the image to be processed; and the generation unit is further configured to process the value to be processed by using the quality scoring model to generate the score of the image to be processed in the target scoring domain by: inputting the initial score into the monotonic neural network to obtain the score of the image to be processed in the target scoring domain, where the number of hidden units in the monotonic neural network is smaller than a preset threshold.

In some optional implementations of this embodiment, the quality scoring model includes at least two monotonic neural networks, and different monotonic neural networks in the at least two monotonic neural networks correspond to different scoring domains; and the generation unit is further configured to input the initial score into the monotonic neural network to obtain the score of the image to be processed in the target scoring domain by: inputting the initial score into the at least two monotonic neural networks to obtain a score, output from each of the at least two monotonic neural networks, of the image to be processed in a scoring domain corresponding to the monotonic neural network.

In some optional implementations of this embodiment, the apparatus further includes: a sample acquisition unit, configured to acquire a training sample set, where a training sample in the training sample set includes a sample image and a reference score of the sample image in a specified scoring domain, and the specified scoring domain and the target scoring domain are different scoring domains; an input unit, configured to input the sample image into the scoring network to obtain an initial score of the sample image; a prediction unit, configured to input the initial score of the sample image into a monotonic neural network to be trained to obtain a predicted score of the sample image in the specified scoring domain; and a determination unit, configured to determine a loss value of the predicted score based on the reference score and the predicted score, and train the monotonic neural network to be trained by means of the loss value to obtain a trained monotonic neural network.

Embodiments of the present disclosure further provide an electronic device and a readable storage medium.

Figure 6:
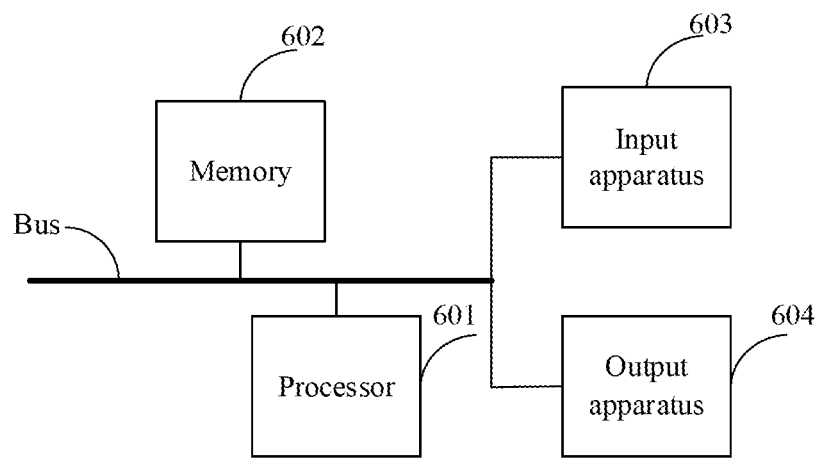
FIG. 6 is a block diagram of an electronic device used to implement the method for processing an image according to embodiments of the present disclosure.

As shown in FIG. 6, which is a block diagram of an electronic device of a method for processing an image according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by an embodiment of the present disclosure. The memory stores instructions executable by at least one processor, so that the at least one processor performs the method for processing a video frame provided by an embodiment of the present disclosure. The non-transitory computer readable storage medium of an embodiment of the present disclosure stores computer instructions for causing a computer to perform the method for processing an image provided by the embodiment of the present disclosure.

The memory 602, as a non-transitory computer readable storage medium, may be used to store non-transitory software programs, non-transitory computer executable programs and modules, such as program instructions/modules corresponding to the method for processing a video frame in the embodiments of the present disclosure (for example, the acquisition unit 501, and the generation unit 502 shown in FIG. 5). The processor 601 executes the non-transitory software programs, instructions, and modules stored in the memory 602 to execute various functional applications and data processing of the server, that is, to implement the method for processing an image in the foregoing method embodiment.

The memory 602 may include a storage program area and a storage data area, where the storage program area may store an operating system and at least one function required application program; and the storage data area may store data created by the use of the electronic device according to the method for processing parking, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for processing parking through a network. Examples of the above network include but are not limited to the Internet, intranet, local area network, mobile communication network, and combinations thereof.

The electronic device of the method for processing an image may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

Flowcharts and block diagrams in the drawings illustrate architectures, functionalities, and operations of possible implementations of systems, methods, and computer program products in accordance with various embodiments of the present disclosure. In this regard, each block in a flowchart or block diagram may represent a module, program segment, or portion of code that contains one or more executable instructions for implementing a specified logical functionality. It should also be noted that in some alternative implementations, the functionalities noted in the blocks may also occur in an order different from that noted in the drawings. For example, two successively represented blocks may actually be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented with a dedicated hardware-based system that performs the specified functions or operations, or may be implemented with a combination of dedicated hardware and computer instructions.

The units involved in embodiments of the present disclosure may be implemented by software, or may be implemented by hardware. The described units may also be provided in a processor, for example, described as: a processor including an acquisition unit, and a generation unit. In some cases, the names of these units do not constitute a limitation to such units themselves. For example, the acquisition unit may also be described as "a unit configured to acquire a value to be processed."

In another aspect, an embodiment of the present disclosure further provides a computer-readable medium. The computer-readable medium may be included in the apparatus described in the above embodiments, or a stand-alone computer-readable medium without being assembled into the apparatus. The computer-readable medium carries one or more programs. The one or more programs, when executed by the apparatus, cause the apparatus to: acquire a value to be processed, where the value to be processed is associated with an image to be processed; and process the value to be processed by using a quality scoring model to generate a score of the image to be processed in a target scoring domain, where the score of the image to be processed in the target scoring domain is related to an image quality of the image to be processed.

The above description is an example embodiment of the disclosure and a description of the technical principles employed. It should be understood by those skilled in the art that the scope of the invention referred to in this disclosure is not limited to the technical solutions formed by specific combinations of the above-mentioned technical features, but also covers other technical solutions formed by any combination of the above-mentioned technical features or equivalents thereof without departing from the inventive concept. For example, the above-mentioned features and the technical features having similar functionalities disclosed in the present disclosure are replaced with each other.

What is claimed is:

1. A method for processing an image, the method comprising:
    acquiring a value to be processed, wherein the value to be processed is associated with an image to be processed; and
    processing the value to be processed by using a quality scoring model to generate a score of the image to be processed in a target scoring domain, wherein the score of the image to be processed in the target scoring domain is related to an image quality of the image to be processed;
    wherein the value to be processed is a score of the image to be processed in an original scoring domain; and
    processing the value to be processed by using the quality scoring model to generate the score of the image to be processed in the target scoring domain comprises:
        inputting the score of the image to be processed in the original scoring domain into the quality scoring model to obtain the score of the image to be processed in the target scoring domain, wherein the quality scoring model is a monotonic neural network, and a number of hidden units in the monotonic neural network is smaller than a preset threshold.

2. The method according to claim 1, wherein the quality scoring model comprises a scoring network and a monotonic neural network; and acquiring the value to be processed comprises:
    inputting the image to be processed into the scoring network to obtain an initial score, output from the scoring network, of the image to be processed; and
    processing the value to be processed by using the quality scoring model to generate the score of the image to be processed in the target scoring domain comprises:
        inputting the initial score into the monotonic neural network to obtain the score of the image to be processed in the target scoring domain, wherein a number of hidden units in the monotonic neural network is smaller than a preset threshold.

3. The method according to claim 2, wherein the quality scoring model comprises at least two monotonic neural networks, and different monotonic neural networks in the at least two monotonic neural networks correspond to different scoring domains; and
    inputting the initial score into the monotonic neural network to obtain the score of the image to be processed in the target scoring domain comprises:
        inputting the initial score into the at least two monotonic neural networks to obtain a score, output from each of the at least two monotonic neural networks, of the image to be processed in a scoring domain corresponding to the monotonic neural network.

4. The method according to claim 2, wherein the method further comprises:
    acquiring a training sample set, wherein a training sample in the training sample set comprises a sample image and a reference score of the sample image in a specified scoring domain, and the specified scoring domain and the target scoring domain are different scoring domains;

inputting the sample image into the scoring network to obtain an initial score of the sample image;

inputting the initial score of the sample image into a monotonic neural network to be trained to obtain a predicted score of the sample image in the specified scoring domain; and determining a loss value of the predicted score based on the reference score and the predicted score, and training the monotonic neural network to be trained by means of the loss value to obtain a trained monotonic neural network.

5. An electronic device, comprising:

one or more processors; and a memory for storing one or more programs, wherein the one or more programs, when executed by the one or more processors, cause the one or more processors to perform operations, the operations comprising:

acquiring a value to be processed, wherein the value to be processed is associated with an image to be processed; and processing the value to be processed by using a quality scoring model to generate a score of the image to be processed in a target scoring domain, wherein the score of the image to be processed in the target scoring domain is related to an image quality of the image to be processed;

wherein the value to be processed is a score of the image to be processed in an original scoring domain; and processing the value to be processed by using the quality scoring model to generate the score of the image to be processed in the target scoring domain comprises:

inputting the score of the image to be processed in the original scoring domain into the quality scoring model to obtain the score of the image to be processed in the target scoring domain wherein the quality scoring model is a monotonic neural network and a number of hidden units in the monotonic neural network is smaller than a preset threshold.

6. The electronic device according to claim 5, wherein the quality scoring model comprises a scoring network and a monotonic neural network; and acquiring the value to be processed comprises:

inputting the image to be processed into the scoring network to obtain an initial score, output from the scoring network, of the image to be processed; and processing the value to be processed by using the quality scoring model to generate the score of the image to be processed in the target scoring domain comprises:

inputting the initial score into the monotonic neural network to obtain the score of the image to be processed in the target scoring domain, wherein a number of hidden units in the monotonic neural network is smaller than a preset threshold.

7. The electronic device according to claim 6, wherein the quality scoring model comprises at least two monotonic neural networks, and different monotonic neural networks in the at least two monotonic neural networks correspond to different scoring domains; and inputting the initial score into the monotonic neural network to obtain the score of the image to be processed in the target scoring domain comprises:

inputting the initial score into the at least two monotonic neural networks to obtain a score, output from each of the at least two monotonic neural networks, of the image to be processed in a scoring domain corresponding to the monotonic neural network.

8. The electronic device according to claim 6, wherein the operations further comprise:

acquiring a training sample set, wherein a training sample in the training sample set comprises a sample image and a reference score of the sample image in a specified scoring domain, and the specified scoring domain and the target scoring domain are different scoring domains;

inputting the sample image into the scoring network to obtain an initial score of the sample image;

inputting the initial score of the sample image into a monotonic neural network to be trained to obtain a predicted score of the sample image in the specified scoring domain; and determining a loss value of the predicted score based on the reference score and the predicted score, and training the monotonic neural network to be trained by means of the loss value to obtain a trained monotonic neural network.

9. A non-transitory computer-readable storage medium, storing a computer program thereon, wherein the computer program, when executed by a processor, causes the processor to perform operations, the operations comprising:

acquiring a value to be processed, wherein the value to be processed is associated with an image to be processed; and processing the value to be processed by using a quality scoring model to generate a score of the image to be processed in a target scoring domain, wherein the score of the image to be processed in the target scoring domain is related to an image quality of the image to be processed;

wherein the value to be processed is a score of the image to be processed in an original scoring domain; and processing the value to be processed by using the quality scoring model to generate the score of the image to be processed in the target scoring domain comprises:

inputting the score of the image to be processed in the original scoring domain into the quality scoring model to obtain the score of the image to be processed in the target scoring domain, wherein the quality model is a monotonic neural network, and a number of hidden units in the monotonic neural network is smaller than a preset threshold.

10. The non-transitory computer-readable storage medium according to claim 9, wherein the quality scoring model comprises a scoring network and a monotonic neural network; and acquiring the value to be processed comprises:

inputting the image to be processed into the scoring network to obtain an initial score, output from the scoring network, of the image to be processed; and processing the value to be processed by using the quality scoring model to generate the score of the image to be processed in the target scoring domain comprises:

inputting the initial score into the monotonic neural network to obtain the score of the image to be processed in the target scoring domain, wherein a number of hidden units in the monotonic neural network is smaller than a preset threshold.

11. The non-transitory computer-readable storage medium according to claim 10, wherein the quality scoring model comprises at least two monotonic neural networks, and different monotonic neural networks in the at least two monotonic neural networks correspond to different scoring domains; and inputting the initial score into the monotonic neural network to obtain the score of the image to be processed in the target scoring domain comprises:
  inputting the initial score into the at least two monotonic neural networks to obtain a score, output from each of the at least two monotonic neural networks, of the image to be processed in a scoring domain corresponding to the monotonic neural network.

12. The non-transitory computer-readable storage medium according to claim 10, wherein the operations further comprise:
  acquiring a training sample set, wherein a training sample in the training sample set comprises a sample image and a reference score of the sample image in a specified scoring domain, and the specified scoring domain and the target scoring domain are different scoring domains;
  inputting the sample image into the scoring network to obtain an initial score of the sample image;
  inputting the initial score of the sample image into a monotonic neural network to be trained to obtain a predicted score of the sample image in the specified scoring domain; and
  determining a loss value of the predicted score based on the reference score and the predicted score, and training the monotonic neural network to be trained by means of the loss value to obtain a trained monotonic neural network.

\* \* \* \* \*